United States Patent [19]

Peters

[11] Patent Number: 5,038,281

[45] Date of Patent: Aug. 6, 1991

[54] ACCELERATION OF SYSTEM INTERRUPTS BETWEEN OPERATING SYSTEMS IN GUEST-HOST RELATIONSHIP

[75] Inventor: Anthony M. Peters, Bedford, Tex.

[73] Assignee: International Business Machines Corporation, Armonk, N.Y.

[21] Appl. No.: 909,523

[22] Filed: Sep. 19, 1986

[51] Int. Cl.[5] .............................................. G06F 9/44
[52] U.S. Cl. ................... 364/200; 364/241.2; 364/280.8; 364/280.9
[58] Field of Search ... 364/200 MS File, 900 MS File

[56] References Cited

U.S. PATENT DOCUMENTS

| | | | |
|---|---|---|---|
| 4,456,954 | 6/1984 | Bullions, III et al. | 364/200 |
| 4,493,034 | 1/1985 | Angelle et al. | 364/200 |
| 4,494,189 | 1/1985 | Bean et al. | 364/200 |
| 4,533,996 | 8/1985 | Hartung et al. | 364/200 |
| 4,564,903 | 1/1986 | Guyette et al. | 364/200 |
| 4,583,166 | 4/1986 | Hartung et al. | 364/200 |
| 4,660,144 | 4/1987 | Walsh | 364/200 |
| 4,665,520 | 5/1987 | Strom et al. | 364/200 |
| 4,674,038 | 6/1987 | Brelsford et al. | 364/200 |

OTHER PUBLICATIONS

P. H. Gum; "System/370 Extended Architecture: Facilities for Virtual Machines", IBM J. Res. Develop., vol. 27, No. 6, Nov. 1983, pp. 530-544.

*Primary Examiner*—David Y. Eng
*Attorney, Agent, or Firm*—Whitham & Marhoefer

[57] ABSTRACT

This disclosure describes the acceleration of system interrupts between one operating system and another operating system which run in a guest-host relationship. The execution time required by the host operating system (HOS) to service system interrupts is substantially reduced, thus allowing the guest operating system (GOS) to execute more efficiently. The invention is implemented by enhancing HOS supervisor services and HOS dispatching functions so that GOS resident supervisor functions are bypassed.

8 Claims, 4 Drawing Sheets

ACCELERATION OF SYSTEM INTERRUPTS BETWEEN OPERATING SYSTEMS IN GUEST-HOST RELATIONSHIP

FIELD OF THE INVENTION

This invention relates generally to computer systems in which an operating system runs in a guest-host relationship with another operating system.

BACKGROUND OF THE INVENTION

During the past few years, the family of computer operating systems known as UNIX has come into wide use in commercial installations. The number of UNIX systems in operation is said to number in the tens-of-thousands and growing. As with other successful computer operating systems, UNIX has been developed in a series of releases, and the evolution continues.

The UNIX operating system was designed for use in a multi-tasking, software development operation. It was developed to execute on minicomputers, and variations of it have been used on other types of machines, most notably on microcomputers such as the IBM Personal Computer. This has been possible because the system is written in the machine independent language "C", which facilitates the conversion of UNIX from one machine to another.

The UNIX operating system has basically two states of operation, the operating system, or kernel, state and the user state. Lower level file management, driver activity and process management occur in the kernel state. Processes normally run in the user state. In the UNIX system a user executes programs in an environment called a user process. When a system function is required, the user process calls the system as a subroutine. At some point in this call, there is a distinct switch of environments. After this, the process is said to be a system process. In the normal definition of processes, the user and system processes are different phases of the same process (they never execute simultaneously). Each time a kernel operating system request is called by a process, state transition changes the user state to the kernel state. When the request has been satisfied, the state is changed (returned) to the user state.

The UNIX system has been ported to larger data systems such as the IBM System/370 computers and other computers performing equivalent functions. In such applications, the UNIX system does not run directly on IBM hardware, but includes a two-level system in a guest-host relationship. The upper level consists of user application code, UNIX system code in the kernel and resident supervisor code. Taken together, the system code in the kernel and resident supervisor code comprise, a system nucleus. The lower level consists of a host operating system already executing on IBM System/370; e.g., the IBM Virtual Machine/System system calls as well as the file system structure. The UNIX resident supervisor allocates system resources and handles all machine-dependent I/0 operations, memory management (including paging), and process scheduling in a virtual environment. The interface between the two layers consists of system interrupts, also known as supervisor calls (SVCs), from the UNIX system to the resident supervisor, and pseudo-interrupts from the resident supervisor to the UNIX system.

The major advantage of this approach is that the UNIX system does not have to concern itself with hardware architecture. One disadvantage is that a performance penalty is paid in communication between the two layers. Also, system algorithms employed in the resident supervisor are not necessarily optimal for the UNIX operating system.

One design of the UNIX operating system for IBM's System/370 computers has been described in the paper by Felton et al entitled "A UNIX System Implementation for System/370", *AT&T Bell Laboratories Technical Journal*, Vol. 63, No. 8, Oct. 1984. This paper describes the UNIX operating system using the TSS/370 operating system as the interface between UNIX and IBM System/370.

Another version of UNIX which operates on the IBM System/370 is called the IBM Interactive Executive for System/370 (IX/370). This version of UNIX was made commercially available by the IBM Corporation in 1985. The IBM operating system VM/SP is used as an interface between the IX/370 version of UNIX and the IBM System/370 hardware to provide various functions such as input/out (I/O), paging, error recording and recovery, which cannot be performed by UNIX or IX/370. The VM/SP operating system provides a well-structured system which provides an elegant interface for UNIX system processes. In such a configuration IX/370 is referred to as the guest operating system (GOS) and VM/SP as the host operating system (HOS).

Like the UNIX operating system running as a GOS, IX/370 includes three types of programs running in two different software levels. One type comprises user programs such as user-written programs and system-provided programs, including the UNIX shell. The second type is the system supervisor code which incorporates much of the function and C-language code of the standard UNIX system kernel. The resident supervisor, the third type, supports the multi-programming of system processes, provides low level system calls and manages the physical system configuration. Each IX/370 system process executes within its own virtual memory. The resident supervisor controls the resources allocated, including process scheduling, dispatching and real storage management.

User programs and the system supervisor of IX/370 share the same process space. The system supervisor is located in the upper eight megabytes of this space, and the user programs are located in the lower eight megabytes. "Page 0" (the Interrupt Storage Area), the lowest 4096 bytes of the process space, is reserved for Program Status Words (interrupt vectors) and other information associated with the process virtual machine. Page 0 is the communications page between IX/370 and the control program (CP) of VM/SP.

A program at one level communicates with the next lower level through system calls which are of two kinds: UNIX system calls and resident supervisor system calls. The latter are used by the UNIX kernel to request certain lower-level functions of the resident supervisor.

In the initial implementation of the IX/370 version of UNIX, its execution as a guest operating system (GOS) under VM/SP as a host operating system (HOS) causes a significant performance problem, even though the inherent characteristics of UNIX and its algorithms allow it to be implemented quite satisfactorily on large machines. In particular, two problem areas relate to the UNIX user-to-kernel linkage and the UNIX kernel-to-user return linkage, which are executed in the HOS. The problem occurs in any implement at a version of UNIX running as a GOS with IBM System/370 UM/SP functionally equivalent HOS. In fact, the problem is generic in that it would occur in any guest GOS running in a HOS where operating system services are readily available from the GOS for use by user processes, e.g., application programs. In such systems, state transitions are performed frequently.

Within the prior art user-to-kernel IX/370 linkage path, eleven privileged instructions are executed by the resident supervisor every time a state transition occurs between user state and kernel state. A privileged instruction can be executed only if the system is running in supervisor state, which is indicated by a bit in the Program Status Word (PSW) of the S/370 hardware. (Instructions are classified as privileged for system integrity purposes. Improper usage of such instructions by application programs, if they were not so classified, could cause profound system damage.)

Reference is made to the books entitled "IBM System/370 Principles of Operation", Manual No. GA22-7000-9 and "Virtual Machine/System Product System Programmer's Guide", Manual No. SC24-5272-1, for descriptions of the terms used herein and their operation. These Manuals are available through an IBM Branch Office.

Examples of the S/370 privileged instructions in the linkage path are LCTL, STCTL, LRA, and STPT. When these instructions are executed in a GOS environment, the performance and scheduling impacts can be substantial. Because the GOS is executing in problem state, each privileged instruction executed by the GOS creates a hardware interrupt to the VM HOS which must simulate the privileged instruction for the GOS. This interruption and simulation can cause many thousands of instructions to be executed due to the actual simulation and scheduling because of the interrupt. In the case of the prior art IX/370, these eleven privileged instructions are located in a critical section of system code that is executed quite often.

Addressing these prior art problem areas more specifically with respect to IX/370, the IX/370 user programs request services from the kernel through IX/370 system calls which cause a state change from the user mode to the kernel mode. This is done by executing a supervisor call (SVC), specifically SVC 10. The frequency of these requests is typically. quite high. IX/370, like other the time that a process is executing in the kernel and in the user state. Because this time accounting is required by the basic design of the UNIX operating system itself, it is not possible to reflect the user-to-kernel SVC from the user directly to the IX/370 kernel. The control program (CP) routine in the HOS which processes the SVCs issued by the user program, termed the SVC handler, must do the necessary timer calculations and store the different times so that the timer and accounting functions. of IX/370 between the SVC issued by the process for kernel services and the actual routine to perform these services is approximately 150 instructions. Moreover, the prior art return, i.e., the kernel to the IX/370 user, is done via SVC 76 and is also accomplished in approximately 150 instructions.

The performance problem when running under VM/SP comes from the additional path length overhead introduced by the privileged operations (PRIV OP) in these linkage paths. FIG. 1 illustrates the prior art user-to-kernel linkage. A SVC 10 call from the GOS (IX/370) user requesting kernel services causes an interruption condition, which results in a change in the program status word (PSW) in System/370. The current PSW is then stored at the SVC old-PSW location, and a new PSW is fetched from the SVC new-PSW location, becoming the current PSW. Control is then passed via a Load Program Status Word (LPSW) instruction to the GOS kernel. In this process, the GOS resident supervisor executes state transition code to perform timer calculations and the state change, involving around 150 instructions as discussed previously. Within the instructions there are privileged instructions (illustrated in FIG. 1 as PRV OP) and each such privileged instruction is intercepted and simulated on behalf of the GOS by the HOS. Each privileged instruction simulation results in many instructions which must be executed for the simulation and causes the process to be redispatched by the HOS to the GOS resident supervisor. Each such redispatching step itself takes many instructions for performing the privileged OP code simulation and in the GOS schedule contained in the HOS control program code.

The return from the GOS kernel to the GOS user, via SVC 76, involves the same process at illustrated in FIG. 2. (SVC 76 is also used in the prior art for kernel-to-kernel state changes as well as kernel-to-user state changes.)

The resident supervisor in IX/370 illustrated in FIGS. 1 and 2 is the IBM TSS/370 resident supervisor described in the above-referenced article by Felton et al. Further description of the operation and function of TSS/370 is found in the books entitled "Time Sharing System, System Logic Summary" Manual No. GY28-2009 and "IBM Time Sharing System - System Programmer's Guide", Manual No. GC28-2008. These Manuals are available through an IBM Branch Office.

SUMMARY OF THE INVENTION

It is therefore an object of my invention to improve the performance of a guest operating system (GOS) operating on a host operating system (HOS) in which system interrupts between a user process and the system nucleus of the GOS are handled by the GOS and the HOS.

It is yet another object of my invention to effect the performance improvement with minimum changes to either the GOS or HOS programs.

More specifically, it is in object of my invention to improve the performance of the UNIX operating system and versions thereof which operate as a guest on a host virtual operating system.

These and other objects of my invention are realized by accelerating the system interrupts from the user to the system nucleus and return. In my preferred embodiment, the user-to-kernel and kernel-to-user (return) system interrupts issued by the GOS bypass the paths normally taken through privileged operation simulation between the HOS and the resident supervisor of the GOS. Each interrupt indicative of a user-to-kernel request and return is identified. and intercepted in the HOS. Subsequently, the request is dispatched directly from the HOS to the kernel or user, as the case may be.

In the preferred embodiment of my invention, SVC 10 remains as the user-to-kernel call, but SVC 76 is replaced by SVC 9 as the kernel-to-user call. In addition, SVC 8 replaces SVC 76 as the kernel-to-resident supervisor call. This will be described further in the Description of the Preferred Embodiment.

The content of the Interrupt Storage Area (ISA), which is the communications page (page 0) between the GOS and the HOS control program, is brought into storage in the HOS. For a user-to-kernel SVC, the SVC old-PSW and SVC interrupt information are moved into the ISA, and the SVC new-PSW is made the SVC current-PSW. When the transition has been made from user to privileged state or from privileged to user state, timer updates are made. The virtual machine (HOS) is then run with the new PSW.

For either transition, the current CPU timer is converted to microseconds and stored in page 0, with zeros stored if the timer value is not positive. For transitions from the user to privileged state, the accumulated user time is calculated in microseconds and stored in the ISA.

Upon completion of the timer and PSW logic functions, the request is dispatched by the HOS.

DETAILED DESCRIPTION OF THE PREFERRED EMBODIMENT

Figure 1:
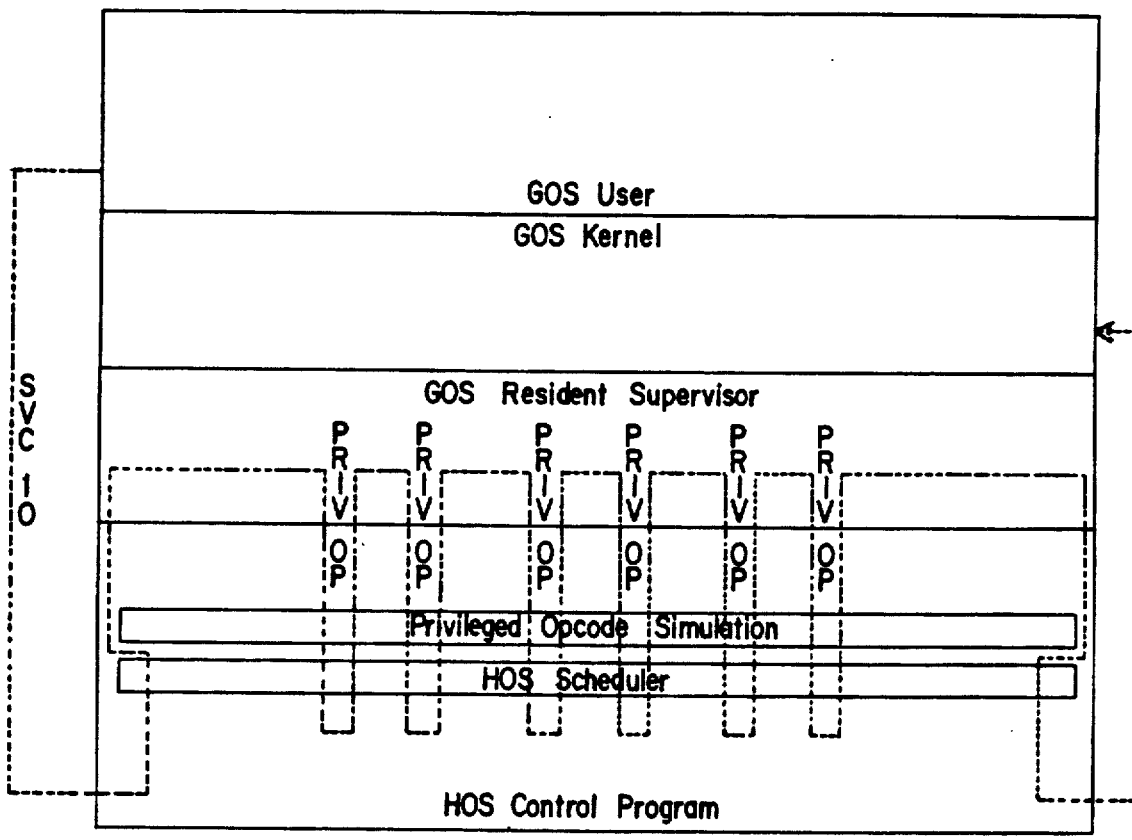
FIGS. 1 and 2 illustrate the prior art architecture for handling, respectively, user-to-kernel and kernel-to-user (return) system interrupts, termed supervisor calls (SVCs).
Figure 2:
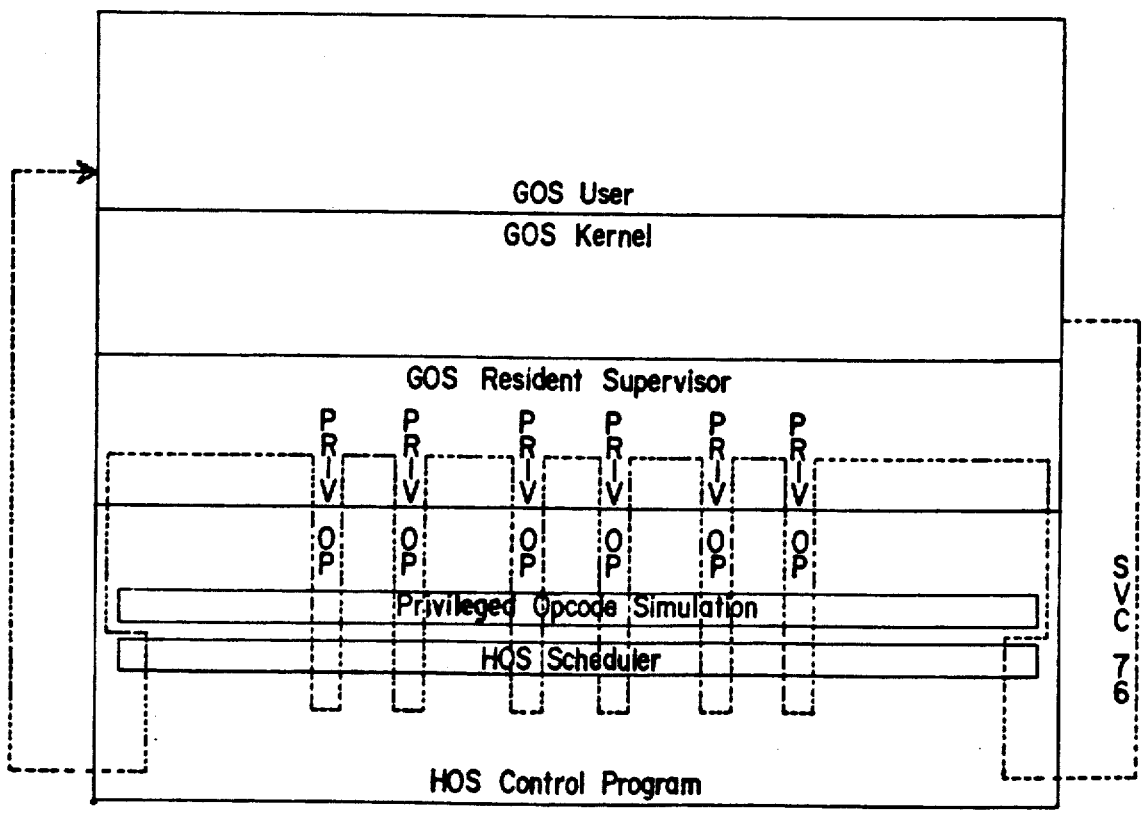
Figure 3:
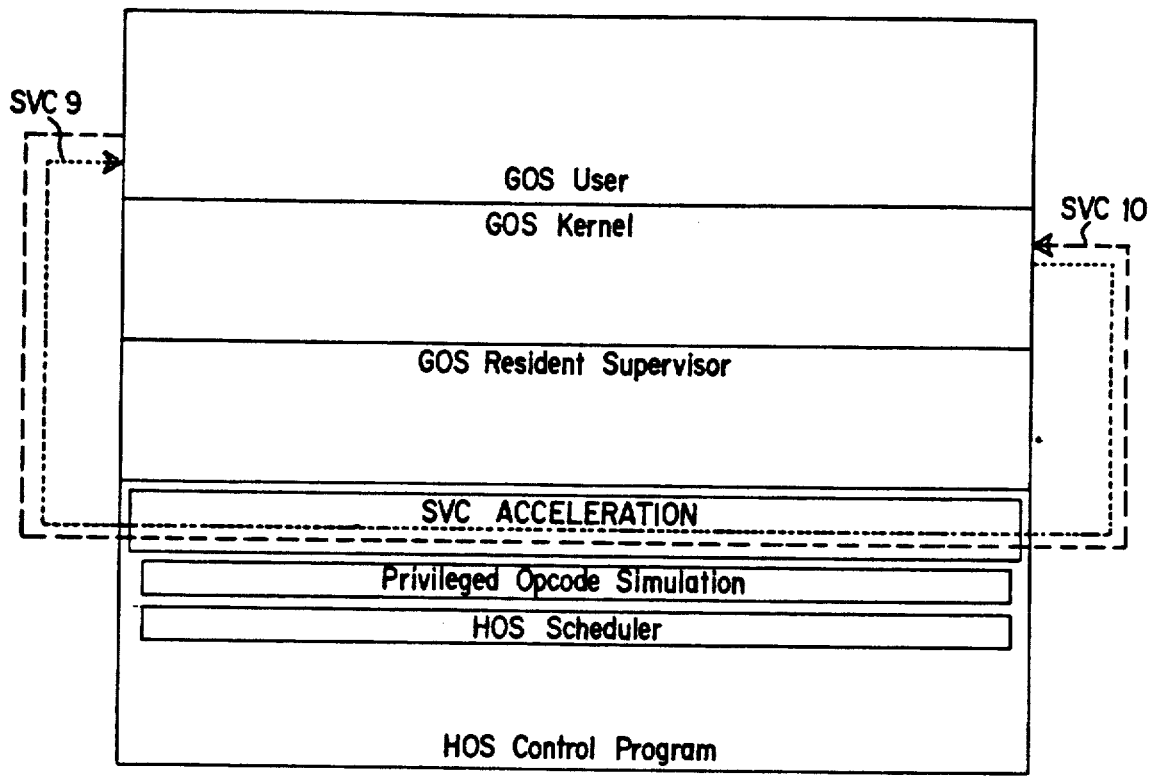
FIG. 3 illustrates the architecture for handling SVCs in accordance with my invention.

FIG. 3 illustrates the architecture for handling the user-to-kernel SVC 10 and return SVC 9 by means of SVC acceleration. The method directly provides the SVC linkage between the GOS comprising GOS User 1 and GOS Kernel 2 and the Control Program (CP)3, bypassing the path normally taken through privileged operation (Privileged Opcode) simulation 4 previously described. As noted previously, SVC 76 was used for the kernel-to-user return i.e., GOS Kernel 2 to GOS User 1, in the prior art architecture. However, SVC 76 had special meaning to the HOS3, specifically that of error recording, and there was additional overhead in processing SVC 76. It was desirable therefore to choose another number for the return SVC, which was chosen to be SVC 9. Moreover, it was necessary to directly reflect kernel-to-kernel (i.e., GOS kernel 2 to GOS Kernel 2) SVCs to the GOS from the HOS3 because it was also using SVC 76 and also required the HOS error recording overhead processing. SVC 8 was chosen for this number because it could be directly reflected from within the SVC acceleration process to the GOS. It is possible to directly reflect SVC 8 to the GOS from the HOS3 because no timer calculations are necessary for a kernel-to-kernel state transition. The handling of SVC 8 forms no part of my invention.

The preferred method of implementing SVC Acceleration is illustrated in the rest of this specification. Specific steps of my invention are discussed with respect to the remaining figures of drawing which are flow charts. In these drawings the usual flow diagram conventions are followed. Specifically, a diamond-shaped block represents a logical operation such as a test or compare function, and a rectangular-shaped block represents a step and a sequence of steps such as load, save and the like. A quasi-elliptical block represents the beginning, end or point of interruption in a program. A circle is used as a connector to designate an entry from, or an exit to, another part of the program flow chart; and a pentagon is used as a connector instead of the circle to designate entry to or exit from a page of drawing.

Figure 4:
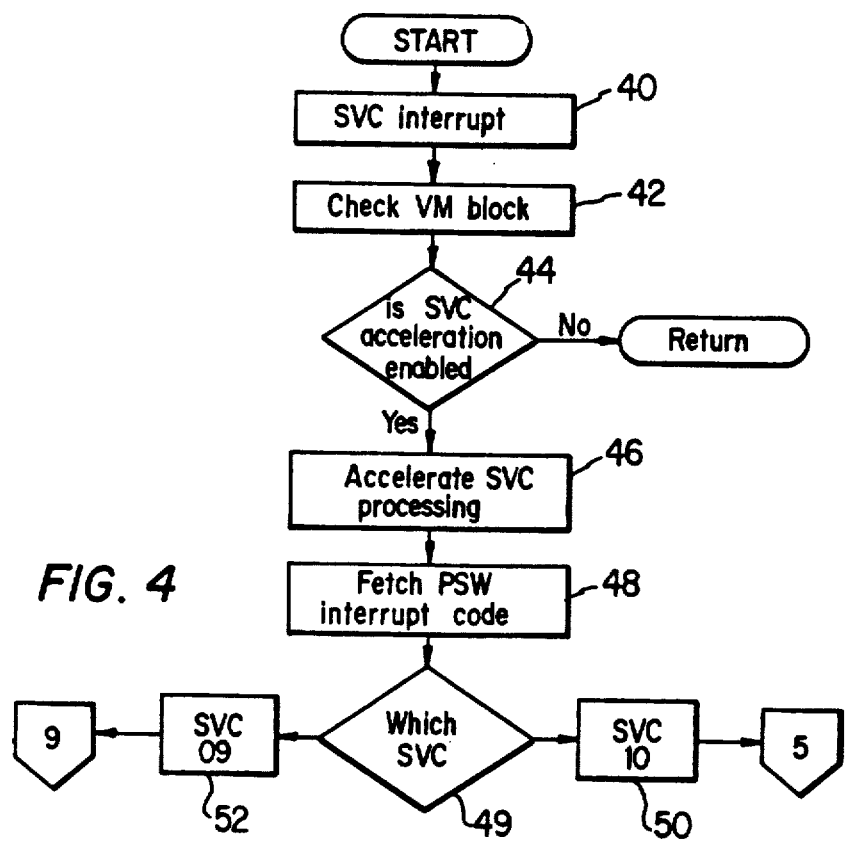
FIG. 4 is a flow diagram of the detection of SVC 9 or SVC 10.

FIG. 4 illustrates the first step in the process of intercepting SVCs 9 and 10 by the HOS control program. In this series of steps, the SVCs of interest are differentiated from other SVCs and identified as being an SVC from the IX/370 GOS. At the start of the process, the program determines that an SVC interrupt has been received by the control program (CP) as shown in block 40. The VM control block of CP, specifically VM BLOK of the VM/SP operating system, is checked as shown in block 42; and a determination is made in decision block 44 an to whether the VM block contains. an SVC acceleration-enabling identifier. If the answer, is no, the program returns tb SVC handler, as no acceleration is required. If the answer is yes, the program begins the process of accelerating the SVC processing as shown in block 46; and the program status word (PSW) interrupt code is fetched as shown in block 48 from the SVC old-PSW. Based on the information in the PSW, a determination is made in devision block 49 as to whether SVC 9 or SVC 10 has caused the interruption. If the interruption has been caused by SVC 9, the program continues to the routine shown in FIG..9; if the interruption has been caused by SVC 10, the process continues to the routine shown in FIG. 5.

Figure 5:
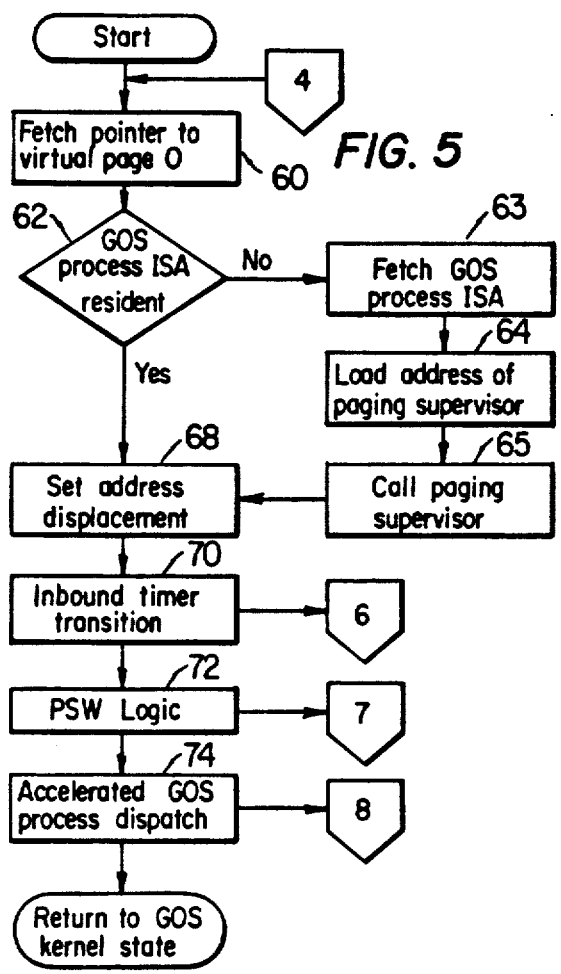
FIG. 5 is a flow diagram illustrating the acceleration of SVC 10 according to my invention.

FIG. 5 illustrates the overall process of accelerating SVC 10. The first step in the process, block 60, begins with fetching the pointer located in the VM Block to the Interrupt Storage Area (ISA), which is the user's virtual page 0 in the GOS.

A determination is then made as to whether the ISA of the GOS process is resident, i.e., loaded in main memory of the CPU (in this embodiment IBM System/370 ), as indicated in decision block 62. If not, the ISA is first fetched, as shown in block 63, the address of the paging supervisor is loaded, as shown in block 64, and an instruction call to the paging supervisor is issued, as shown in block 65. The GOS process ISA must be resident in storage because the GOS fetches PSWs from the ISA when it services an SVC interrupt from the GOS and also stores timer and accounting information in ISA fields as part of SVC acceleration processing. Upon completion of these steps, the address displacement is set so that the real page stored in main memory maps to the virtual page, as shown in block 8. If the ISA were already resident, the program would proceed directly to block 68.

After the address displacement has been set, the time in the timer of the CPU is converted for use by the GOS directly. This step will be further described with respect to FIG. 6. After the timing has been converted, the PSW of the GOS is converted to become the current PSW of the HOS. This process will be further described with respect to FIG. 7.

After the PSW has been converted, the user-to-kernel SVC 10 can then be dispaced directly to the kernel without involving the privileged instructions in the HOS. This accelerated dispatching is further described with respect to FIG. 8. After the SVC has been dispatched., the system is returned to the kernel state of the GOS.

Figure 6:
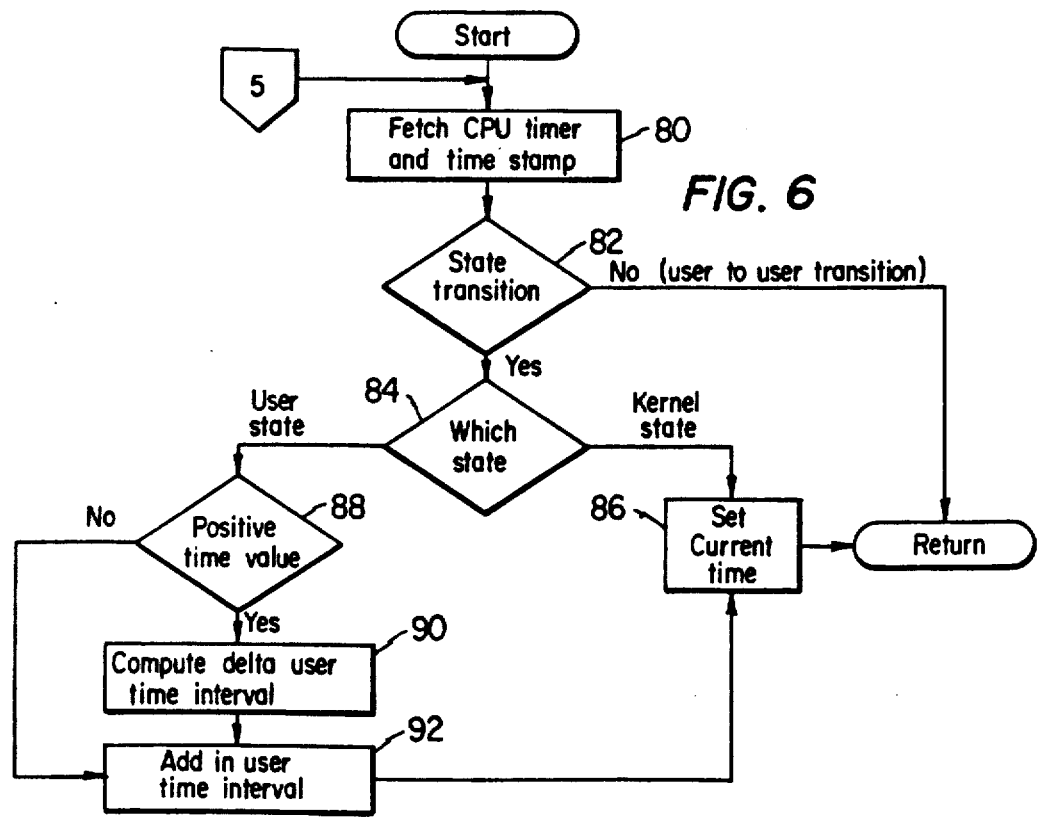
FIG. 6 is a flow diagram of the inbound timer transition which is used in handling a SVC 10.

FIG. 6 describes the conversion of the CPU absolute time for use by the GOS as a time interval. The computation for the timer interval is necessary because IX/370 and other versions of UNIX maintain system execution times based on the execution times spent in the kernel and the application programs. This is important for two primary reasons. The first is to optimize the performance of the system by providing the user applications the maximum amount of CPU execution time possible by minimizing the execution time spent in the kernel. The differential of kernel and user execution times must therefore be maintained by the system. The second reason is for computer resource billing and accounting purposes. Kernel execution is sometimes serial, allowing only one program executing in a section of kernel code at a time. Kernel execution time is sometimes therefore at a premium, and should be accounted for at a higher charge for the user programs. Such pricing differentials are important considerations in commercial and time sharing installations. The process begins by fetching the CPU timer and time-stamp code from the CPU-as shown in block 80. A decision is made at this point whether a state transition is involved. If the answer is no, for example, only a user-to-user transition in the GOS is taking place, the program returns to the process shown in FIG. 5. If the answer is yes, a decision is made as shown in decision block 84 as to whether the transition is to the user state or to the kernel state. If it is from the user state, a determination is made, decision block 88, as to whether the CPU timer shows a positive time value. If the answer is yes, a time interval based on the time value is computed as shown in block 90. If the answer is no, the user time interval is added without going through the computation step of block 90. In either case the user time interval is then added as shown in block 92. After this step the current time is set as shown in block 86. Returning to decision block 84, if the transition is from the kernel state, the current time from the CPU is set without going through the computation steps previously described. Upon completion of this step, the program returns to the process shown in FIG. 5.

Figure 7:
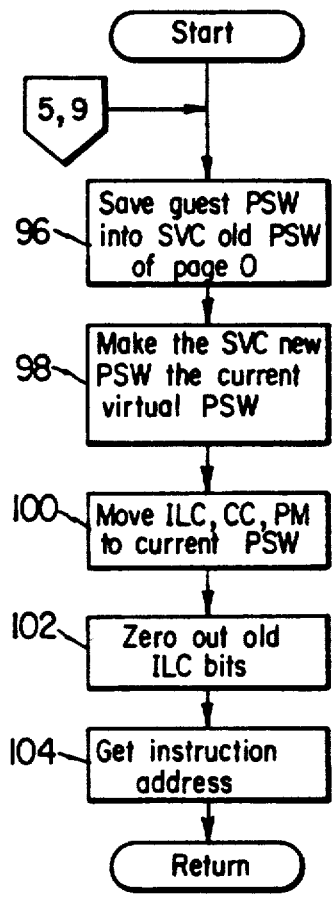
FIG. 7 is a flow diagram of the program status word (PSW) logic in handling SVC 9 and SVC 10.

Turning now to FIG. 7, the control program (CP) stores the PSW of the GOS, which is the SVC-old PSW of page 0, the ISA. The SVC-new PSW is then made the current virtual PSW as shown in block 98. The eight byte PSW is made current by creating the contiguous fields shown in block 100. Information concerning the Instruction Length Counter (ILC), Condition Code (CC) and Program Mask (PM) of the PSW are then moved to the current PSW as shown in block 100. The old ILC bits are cleared (converted to zero) as shown in block 102 because they are not necessary at this point in the operation. The ILC will be reset by the hardware at the execution of the next instruction after the new PSW is loaded. The instruction address is then set in the PSW as shown in block 104. The program, then returns to the process shown in FIG. 5.

Figure 8:
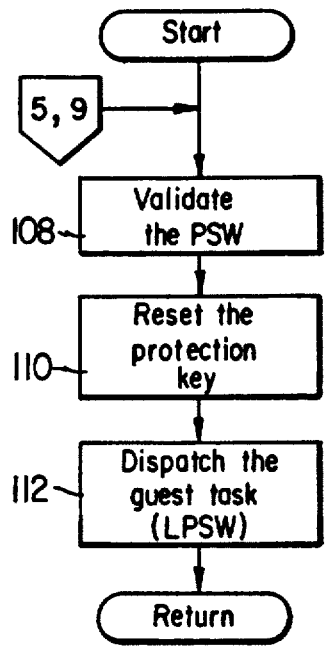
FIG. 8 is a flow diagram of the accelerated dispatching of the GOS process in accordance with my invention for both SVC 9 and SVC 10.

At this point, with the PSW fields having been converted, the user-to-kernel SVC may be accelerated, i.e., dispatched directly rather than through CP. This is shown in FIG. 8. After validating the PSW as shown in block 108 and resetting the protection key as shown in block 110, the guest task in the form of a load program status word instruction (LPSW) is then issued. The protection key is reset because the kernel executes with a key of zero, which indicates to the hardware that the storage protection is not in effect. This allows the kernel to read or write the entire address space of the UNIX process. When a process is executing with an assigned storage key, the user task is prohibited from storing or fetching from the kernel address space. When the transition is from kernel-to-user state (SVC 9), the PSW protection key is reset from zero to the value assigned to the process. The program then returns to the start in FIG. 5.

Figure 9:
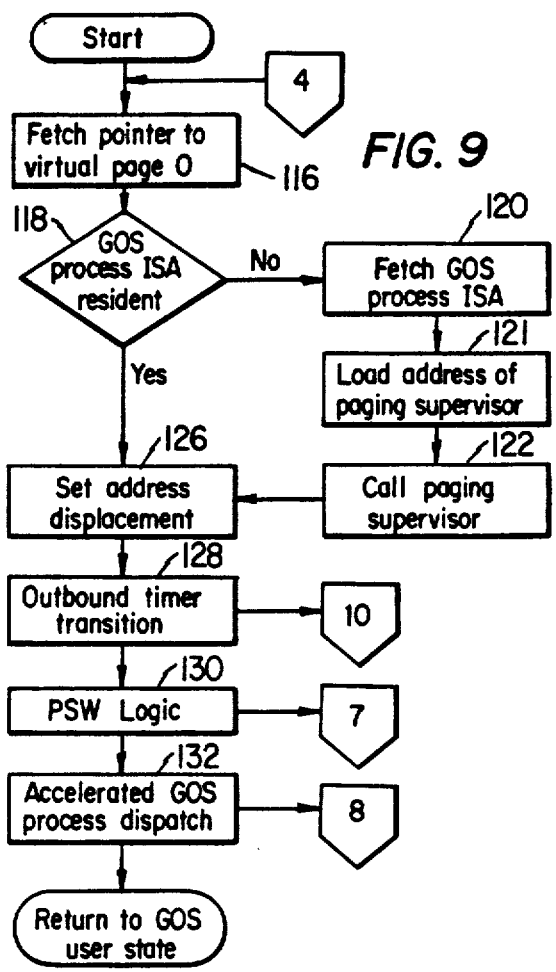
FIG. 9 is a flow diagram illustrating the acceleration of SVC 9 according to my invention.

FIG. 9 illustrates the return instruction, i.e., the kernel-to-user linkage acceleration. As will be noted, the process is similar to the user-to-kernel linkage illustrated in FIG. 5 in many respects. The first step in the process begins with fetching the pointer to the user's virtual page 0 in the GOS as shown in block 116. A determination is then made as to whether the ISA of the GOS process is resident in decision block 118. If not, the ISA is first fetched, as shown in block 120, the address of the paging supervisor is loaded as shown in block 121, and an instruction call which pages the ISA is issued as shown in block 122. Upon completion of these steps, the address displacement is set as shown in block 126. If the ISA were already resident, the program would proceed directly to block 126.

After the address displacement has been set, the time in the timer of the CPU is converted for use by the GOS directly. This step is further described with respect to FIG. 10. After the timing has been converted, the PSW of the GOS is converted to become the current PSW of the HOS. This process is the same as has been described previously with respect to FIG. 7, and a further description at this point is unnecessary.

After the PSW has been converted and loaded, the kernel-to-user SVC interruption has been dispatched directly to the used without simulating the privileged instructions in the HOS. This accelerated process has already been described with respect to FIG. 8. After the SVC has been processed the system is returned to the user state of the GOS.

Figure 10:
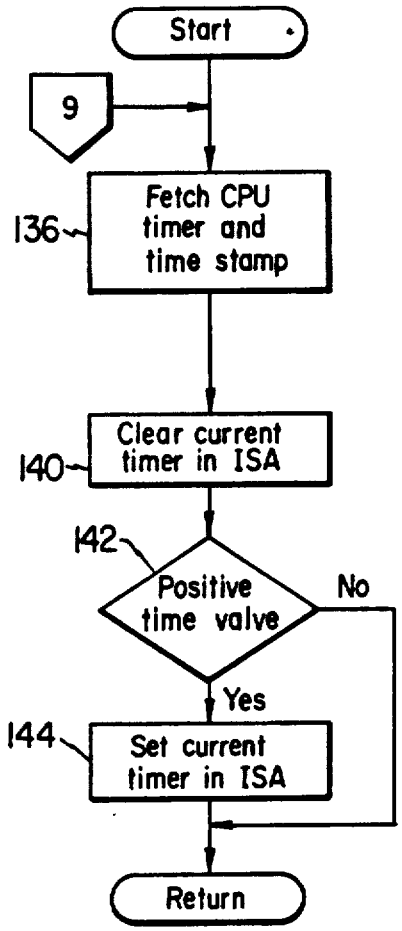
FIG. 10 is a flow diagram of the outbound timer transition which is used in handling a SVC 9.

Turning now to FIG. 10, the timer transition is initiated by first, fetching the timer value in the CPU as shown in block 136. This time value is converted to microseconds as shown in block 138, and the current timer value in the interrupt storage area (ISA) of the GOS is cleared as shown in block 140. If the time value is not positive, the program returns to the start at FIG. 9. If the timer value is positive, this time value is set in the ISA of the GOS and the program returns to block 128 of FIG. 9 to allow further processing.

In conclusion, I have substantially improved the performance of a GOS running on an HOS in a data processing system by improving the supervisor services and dispatching functions of the HOS as illustrated in the specification and accompanying drawing. My invention has been described with respect to the preferred embodiment, but it will be understood by those skilled in the art that changes may be made therein without departing from the spirit and scope of the invention.

I claim:

1. In a data processing system having a guest operating system (GOS) running under a host operating system (HOS), said GOS including a user level and a system nucleus in which system interrupts are used to service requests between the user level and the nucleus, a method for accelerating system interrupts between said GOS and HOS comprising the steps of:
   identifying in the HOS each GOS interrupt issued as a result of a user-to-nucleus request; and
   then dispatching the request directly from the HOS to the GOS nucleus.

2. A method as in claim 1 further comprising:
   identifying in the HOS each interrupt issued as a result of a nucleus-to-user request; and
   dispatching the request from the HOS directly to the GOS user.

3. A method as in claim 1 further comprising, prior to said dispatching:
   accessing, by the HOS, information contained in the GOS relating to timing; and
   performing timing calculations required by the GOS in the HOS.

4. A method as in claim 1 wherein said GOS stores a program status work indicating an interrupt type, said method further comprising, prior to said dispatching:
   converting the program status work stored by the GOS into a new program status work in the HOS.

5. In a data processing system having a guest operating system (GOS) running under a host operating system (HOS), said GOS including a user level and a system nucleus of a kernel and a resident supervisor in which interrupts are used to service requests between the user level and the nucleus, a method for accelerating system interrupts between said GOS and HOS comprising the steps of:
   identifying the HOS each GOS interrupt issued as a result of a user-to-kernel request; and
   then dispatching the request directly from the HOS to the GOS kernel, bypassing the resident supervisor.

6. A method as in claim 5 further comprising;
   identifying the HOS each interrupt issued as a result of a kernel-to-user request; and
   dispatching the request from the HOS directly to the GOS user, bypassing the resident supervisor.

7. A method as in claim 5, further comprising, prior to said dispatching:
   accessing, by the HOS, information contained in the GOS relating to timing; and
   performing timing calculations required by the GOS in the HOS.

8. A method as in claim 5 wherein said GOS stores a program status word indicating an interrupt type, said method further comprising, prior to said dispatching:
   converting the program status work stored by the GOS into a new program status word in the HOS.

* * * * *